No. 612,321. Patented Oct. 11, 1898.
J. EVANS.
AGRICULTURAL SPRINKLER.
(Application filed Dec. 20, 1897.)
(No Model.) 2 Sheets—Sheet 1.
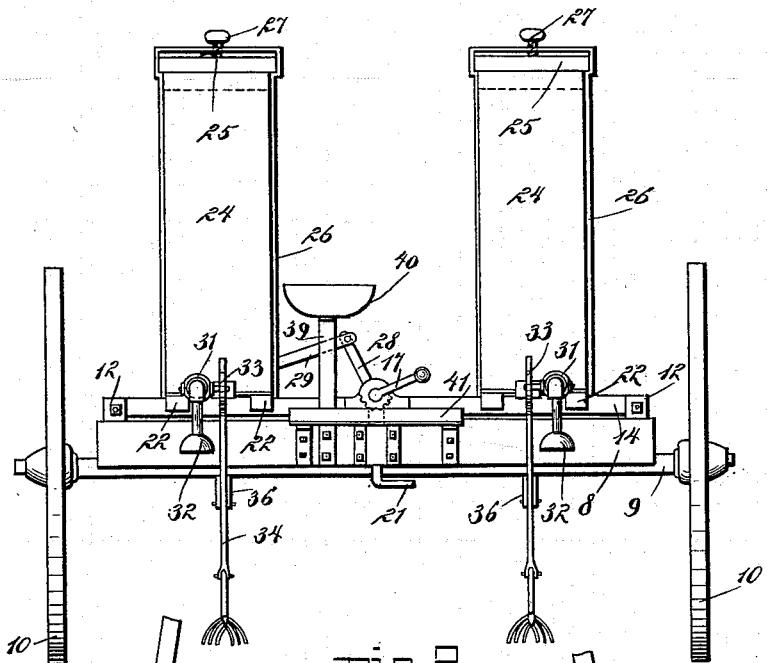
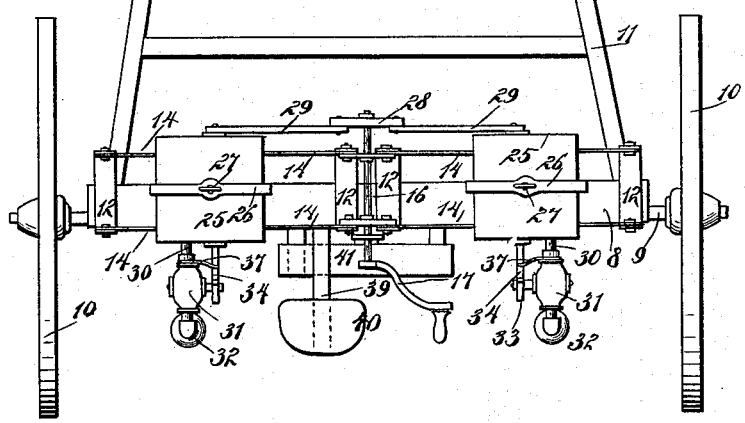
WITNESSES:
J. H. Brophy
Isaac W...
INVENTOR
J. Evans
BY
ATTORNEYS.

No. 612,321. Patented Oct. 11, 1898.
J. EVANS.
AGRICULTURAL SPRINKLER.
(Application filed Dec. 20, 1897.)
(No Model.) 2 Sheets—Sheet 2.
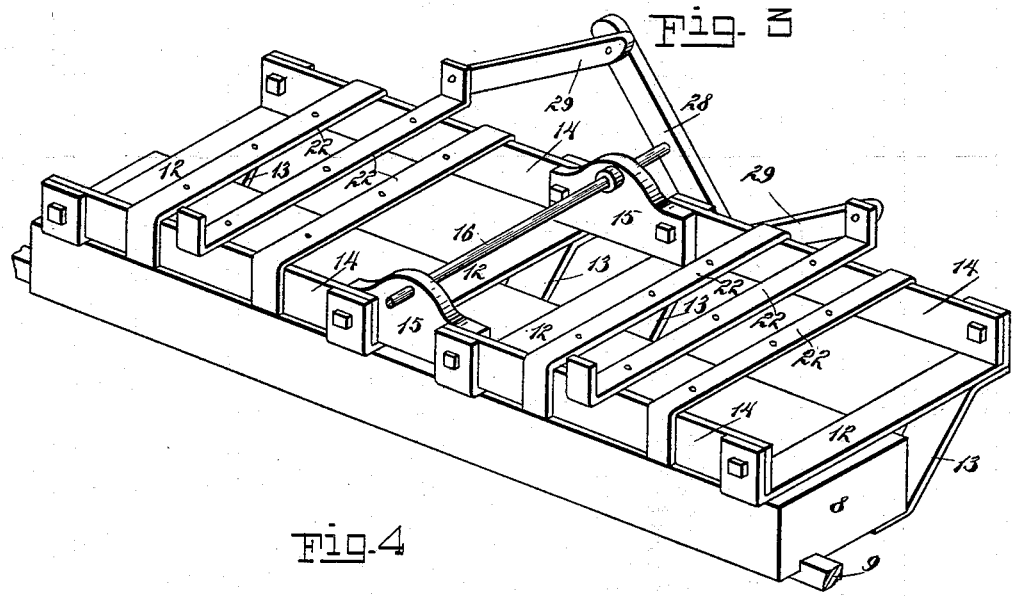
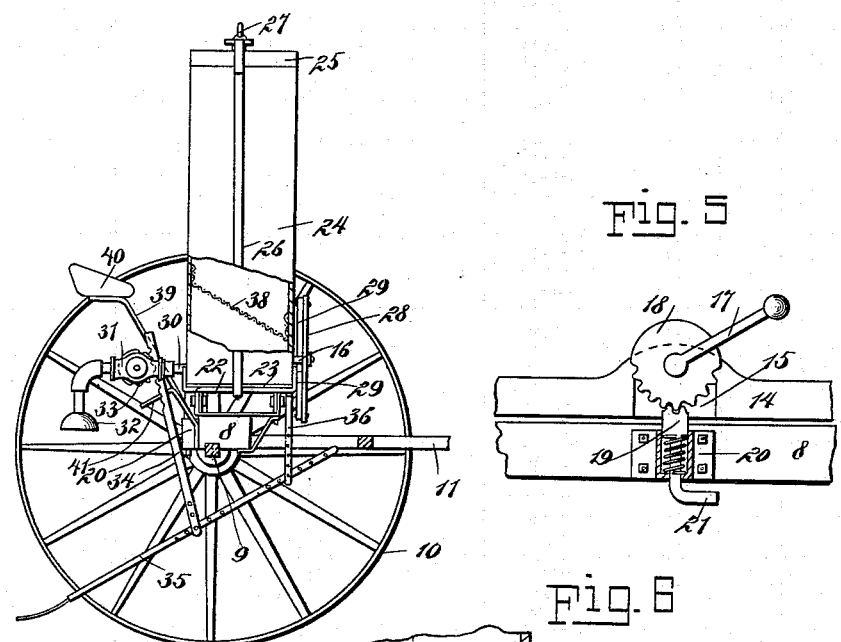
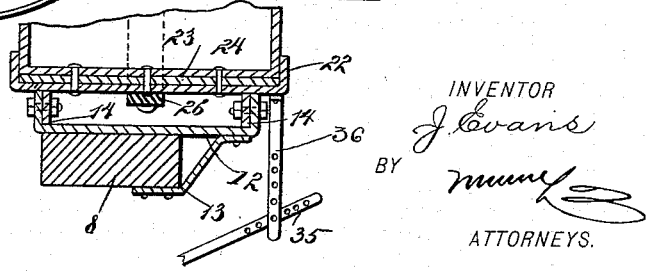
WITNESSES:
J. H. Brophy
Isaac O'Bey(?)
INVENTOR
J. Evans
BY
ATTORNEYS.
THE NORRIS PETERS CO., PHOTO-LITHO., WASHINGTON, D. C.

UNITED STATES PATENT OFFICE.

JOHN EVANS, OF SALT LAKE CITY, UTAH, ASSIGNOR OF ONE-HALF TO JAMES LEWIS HODGES, OF SAME PLACE.

AGRICULTURAL SPRINKLER.

SPECIFICATION forming part of Letters Patent No. 612,321, dated October 11, 1898.

Application filed December 20, 1897. Serial No. 662,583. (No model.)

*To all whom it may concern:*

Be it known that I, JOHN EVANS, of Salt Lake City, in the county of Salt Lake and State of Utah, have invented a new and Improved Agricultural Sprinkler, of which the following is a full, clear, and exact description.

This invention is an agricultural sprinkler designed to deposit upon plants a liquid poison by which to kill vermin on the plants, the invention comprising one or more tanks or reservoirs and a drag-bar for each tank, the bars controlling valved outlets from the tanks and being actuated by engagement with the plants.

This specification is the disclosure of one form of my invention, while the claims define the actual scope of the invention.

Reference is to be had to the accompanying drawings, forming a part of this specification, in which similar characters of reference indicate corresponding parts in all the views.

Figure 1 is a rear elevation of the invention. Fig. 2 is a plan view. Fig. 3 is a fragmentary perspective showing the bed of the sprinkler and illustrating a portion of the slides whereon are seated the two tanks with which the preferred form of my invention is provided. Fig. 4 is a vertical section taken centrally through the machine and showing a part of one tank broken away. Fig. 5 is a fragmentary elevation of a hereinafter-described detail, and Fig. 6 is an enlarged section taken through the bed of the machine and the means by which the tanks are mounted to slide.

The invention has a bolster 8 running longitudinally with and bearing on the axle 9. This bolster forms the bed of the machine. The axle 9 is mounted on wheels 10, and the bolster or bed 8 is in connection with the thills 11, by which the machine may be drawn. Rigidly secured to the top of the bed 8 and extending longitudinally with the machine are four frame-plates 12, projecting forwardly of the bed and braced by struts 13, running down to the under side of the bed. The ends of the plates 12 are upturned, and said plates are provided with two bisected rails 14. The rails 14 are arranged parallel with each other and with the axle. The contiguous ends of the alined members of each pair of rails 14 are joined rigidly to each other by means of bearing-blocks 15, wherein is mounted a shaft 16, extending longitudinally with the machine. The shaft 16 is provided at its rear end with a crank 17, by which it may be turned. The shaft 16 is also provided with a gear 18, pressed by a spring-actuated pawl 19. The pawl 19 is carried in a casing 20, attached to the bed 8, and the pawl is provided with a horizontally-extending arm 21, projecting below the bed, by which arm the pawls may be moved downward to disengage the gear 18. This construction serves to hold the shaft 16 rigid in any desired position.

Sliding on the rails 14 and one on each side of the shaft 16 are slides or carriages for the tanks. These slides or carriages consist each, as best shown in Figs. 3 and 6, of three bars 22, ranging longitudinally with the machine. The two side bars of the three bars 22 have their ends bent downward outside of the rails 14, so as to prevent the bars from being displaced, and the intermediate bar 22 has its ends turned upward to prevent the displacement of the tank, as will be fully described hereinafter. Rigidly secured to the bars 22 of each slide or carriage is a bed-plate 23. On the bed-plate 23 of each slide or carriage a tank 24 is mounted. The tanks 24 are open at their upper ends and provided with closures 25, which bear down upon said ends. The tanks are held in position and the closures 25 locked in place by means of yokes 26, one for each tank. Each yoke 26 passes beneath the corresponding bars 22 and plate 23 and is rigidly bolted or riveted to said parts. The upper end of each yoke 26 carries a set-screw 27. These screws 27 bear down upon the covers 25 and securely hold the same as well as acting to hold the tanks 24. The front end of the shaft 16 is provided with a lever 28, attached to the shaft at its middle and provided at each end with a pivoted link 29. The links 29 are respectively connected to the forward upturned ends of the intermediate bars 22 of the carriages or slides. By these means the tanks are mounted rigidly in place and it is possible to adjust them toward and from each other with ease, so as to adapt the machine to rows of plants of varying distances apart. As shown in Fig. 4, each tank is provided with an inclined screen 38, which serves to strain the liquid that passes from the tank.

Leading from each tank 24 is a pipe 30. Each pipe 30 is controlled by a valve 31, and from each valve 31 passes an elbow-pipe carrying a rose 32. Attached to the stem of each valve 31 is a gear 33, with which the rack-bars 34 respectively coact. The rack-bars 34 are respectively pivoted to drag-bars 35, which are mounted at their forward ends on arms 36, which depend, respectively, from the front portions of the intermediate bars 22. The connections between the parts 34, 35, and 36 are adjustable, as shown in Figs. 4 and 6. Springs 37 are attached, respectively, to the pipes 30 and bear against the rack-bars 34, whereby to press said bars into constant engagement with the gears 33. As the machine rides over a row of plants and as the drag-bar 35 engages the plant the drag-bar is lifted at its rear end, which also lifts the rack-bar 34, causing said bar to turn the stem of the valve 31 and open the valve. This permits a quantity of the poison liquid within the tank 24 to be dropped upon the plants, and by these means the vermin are exterminated.

Projecting upward and rearward from the rear of the bed 8 is a standard 39, which carries a seat 40. A foot-rest 41 also is carried by the bed 8 at a point beneath the seat 40.

Having thus described my invention, I claim as new and desire to secure by Letters Patent—

1. The combination with a wheeled support, of a tank mounted thereon, a valve controlling the outlet from said tank, a gear in connection with the stem of said valve to operate the valve, a rack-bar meshing with the gear, and a pivotally-mounted drag-bar in connection with the rack-bar.

2. The combination with a wheeled bed or bolster, of tracks mounted thereon, two carriages or slides mounted on the tracks, means for moving the carriages or slides toward and from each other, and a reservoir mounted on each carriage or slide.

3. The combination with a bolster or bed, of carriages or slides mounted thereon, means for moving the carriages or slides toward and from each other, and a reservoir mounted on each carriage or slide.

4. The combination with a bed or bolster, of carriages or slides mounted thereon, a reservoir mounted on each carriage or slide, a shaft mounted to rock between the same, and connections between the carriages and said shaft.

5. The combination with a bed or bolster, of rails mounted thereon, carriages or slides movable on the rails, a reservoir seated on each carriage or slide, a yoke encircling each reservoir and its respective carriage or slide, and means for moving the carriages or slides toward and from each other.

6. The combination with a support, of two carriages or slides, a shaft mounted to rock between the same, a lever attached to the shaft, a link attached to each end of the lever and respectively to the carriages or slides, a gear attached to the shaft, and a spring-pressed pawl engaging the gear to rock the shaft.

7. The combination with a wheeled support, of a reservoir mounted thereon, a valve controlling an outlet from the reservoir, means for operating the valve, and a drag-bar extending longitudinally with the support and pivotally mounted thereon, the drag-bar having connection with the means for operating the valve and having its free end projected downward into proximity with the ground.

JOHN EVANS.

Witnesses:
R. J. ROBINSON,
JAMES LANGTON.